UNITED STATES PATENT OFFICE.

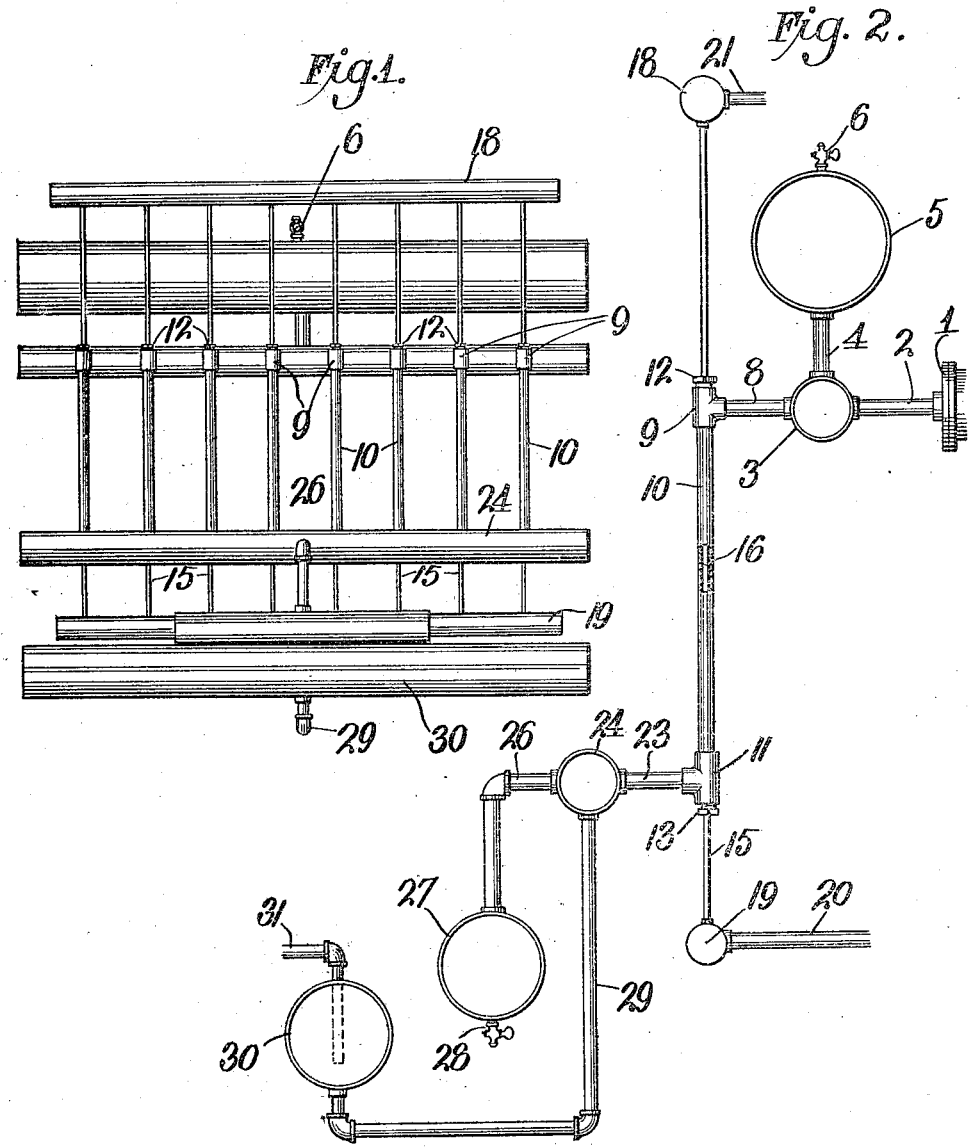

ELIHU C. UNDERWOOD AND WILLIAM C. MOORE, OF KANSAS CITY, MISSOURI.

CONDENSER FOR REFRIGERATING APPARATUS.

1,272,730. Specification of Letters Patent. Patented July 16, 1918.

Application filed March 3, 1916. Serial No. 81,852.

*To all whom it may concern:*

Be it known that we, ELIHU C. UNDERWOOD and WILLIAM C. MOORE, citizens of the United States, residing at Kansas City, in the county of Jackson and State of Missouri, have invented certain new and useful Improvements in Condensers for Refrigerating Apparatus; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to an ammonia condenser for refrigerating apparatus, and has for its principal object to secure effective condensation of circulating fluid and separation of gases from liquid ammonia in a refrigerating system of the ammonia type.

In accomplishing this object we have provided improved details of structure, the preferred forms of which are illustrated in the accompanying drawings, wherein:—

Figure 1 is a front elevation of condensing and separating elements containing our improvements.

Fig. 2 is an end view of the same.

Referring more in detail to the drawings:—

1 indicates a pump which may be of any ordinary type and adapted for drawing ammonia gases from the expansion element (not shown) of the system.

Leading from the pump 1 is a conduit 2 through which gases from the pump are delivered to a manifold 3 and leading vertically from the manifold is a conduit 4 through which gases may rise into a purge tank 5 having a cock 6 through which the tank may be relieved.

Leading from the manifold 3 at a point below the outlet to the conduit 4 are pipes 8 of any suitable number and spaced to draw the gases from the manifold at intervals throughout the length thereof, the said pipes having T fittings 9 at their ends opposite the manifold. The heads of the T fittings are arranged vertically and secured in the lower members of said heads are the upper ends of pipes 10, the lower ends of which are connected with T fittings 11 that are arranged similarly to the upper fittings 9.

The upper members of the fittings 9 and the lower members of the fittings 11 carry packing nuts 12—13, and extending through the packing nuts, the fittings, and the pipes 10, are cooling liquid pipes 15 of sufficiently less diameter than the pipes 10 to provide the annular channels 16 through which gases from the manifold 3 may be delivered about the cooling pipes. The cooling liquid pipes 15 are connected at their opposite ends with manifolds 18—19 respectively, which, in turn, have communication with supply and offtake conduits 20—21 that lead to a source of supply (not shown).

Leading from each of the lower fittings 11 is a pipe 23 that opens into a manifold 24, so that ammonia liquid condensed from the gases during the travel of the latter through the pipes 10 may be delivered into the manifold; the connection of the pipes 23 with the manifold being preferably above the bottom of the manifold.

Opening from the manifold above the bottom thereof is a pipe 26 that leads to a gas purge tank 27, having a drain cock 28 thereon, and opening from the manifold 24 at a point below the intake of the pipe 26 is an ammonia liquid pipe 29 that leads to a reservoir 30 having a supply pipe 31 projected thereinto and through which liquid ammonia may be delivered to the point of use; the pipe 31 being projected through the top of the reservoir and to near the bottom thereof so that it will take liquid from a point below the normal level of liquid in the tank and thereby insure against the drawing off of any gases which might possibly carry through from the manifold 24.

Assuming the parts to be constructed and assembled as described, and further assembled with other parts of a refrigerating system, which other parts may be of any ordinary type, ammonia, after expansion to effect the cooling, is drawn to the pump and forced therefrom into the manifold 3, from which it, with other gases that may be carried along with it, pass into the purge tank from which they may be drawn off through the cock 6. In operation, the ammonia and other gases pass from the manifold 3 into the condenser pipes and flow downwardly along the cooling tubes so that the gases are cooled and returned to liquid, except for some of the non-condensable or very heavy gases. This liquid, with the lighter gases, is passed into the manifold 24 and the liquid passes down through the pipe 29 to the reservoir. The non-condensable gases, and those gases which are not condensable at the temperature of the cooler flow through the pipe 26 into the purge tank 27, from which they may be drawn through the cock 28.

With this apparatus we not only secure effective separation of the gases which are either non-condensable or not condensable at the cooling temperature, so that the liquid which eventually reaches the point of use is free from these gases, and we thereby obviate the loss of efficiency which is usually present in the ordinary refrigerating systems of this character, because of the presence in the expansion elements of the system of the gases which we eliminate at the purge tanks.

By arranging the condenser tubes vertically, we not only secure a more effective and quicker condensing action of the cooling liquid of the gases, but by the arrangement shown, we apply the cooling fluid initially at the point of delivery of the gases, and before the temperature of the liquid has been raised because of proximity to the gases. In other words the cooling is progressive from the point of gas intake and obviates extremes.

Having thus described our invention, what we claim as new therein, and desire to secure by Letters-Patent, is:—

1. In refrigerating apparatus, in combination with a manifold, a cooling member, a conduit leading from the cooling member to the manifold, a purge tank having communication with the manifold above the bottom thereof, and a liquid offtake communicating with the manifold below the intake to the purge tank.

2. In a refrigerating apparatus, in combination with a manifold, of a pump for delivering ammonia gases to the manifold, a purge tank having communication with the manifold near the top thereof, a plurality of condenser pipes, each having communication with the manifold beneath the purge tank connection, cooling pipes extended through the condenser pipes, a manifold, pipes connecting the condenser pipes with the last named manifold above the bottom thereof, a second purge tank having communication with the second manifold above the bottom thereof, a receiver, means connecting the receiver with the second manifold at a point below the intake to the second purge tank, and an offtake pipe leading from the receiver.

In testimony whereof we affix our signatures.

ELIHU C. UNDERWOOD.
WILLIAM C. MOORE.

Copies of this patent may be obtained for five cents each, by addressing the "Commissioner of Patents, Washington, D. C."